(12) United States Patent
Surdu

(10) Patent No.: US 10,250,595 B2
(45) Date of Patent: Apr. 2, 2019

(54) EMBEDDED TRUSTED NETWORK SECURITY PERIMETER IN COMPUTING SYSTEMS BASED ON ARM PROCESSORS

(71) Applicant: Oleksii Surdu, Broadlands, VA (US)

(72) Inventor: Oleksii Surdu, Broadlands, VA (US)

(73) Assignee: GBS Laboratories, LLC, Herndon, VA (US)

( * ) Notice: Subject to any disclaimer, the term of this patent is extended or adjusted under 35 U.S.C. 154(b) by 274 days.

(21) Appl. No.: 15/063,625

(22) Filed: Mar. 8, 2016

(65) Prior Publication Data

US 2017/0264607 A1 Sep. 14, 2017
US 2018/0316662 A9 Nov. 1, 2018

Related U.S. Application Data

(60) Provisional application No. 62/139,977, filed on Mar. 30, 2015.

(51) Int. Cl.
*H04L 9/32* (2006.01)
*H04L 29/06* (2006.01)
(Continued)

(52) U.S. Cl.
CPC ........ *H04L 63/0853* (2013.01); *H04L 9/3234* (2013.01); *H04L 9/3247* (2013.01);
(Continued)

(58) Field of Classification Search
CPC ............. H04L 63/0853; H04L 63/0272; H04L 9/3247
See application file for complete search history.

(56) References Cited

U.S. PATENT DOCUMENTS 8,151,337 B2  4/2012  Crowell et al.
8,190,778 B2  5/2012  Shanbhogue
(Continued)

OTHER PUBLICATIONS

ARM, "ARM Cortex-A9 Technical Reference Manual, Revision: r4p1", 2016.
(Continued)

*Primary Examiner* — Khoi V Le
(74) *Attorney, Agent, or Firm* — Capitol City TechLaw, PLLC; Jasbir Singh

(57) ABSTRACT

The invention relates to a method for computer systems based on the ARM processor, for example mobile devices, wherein the ARM processor provides fully hardware isolated runtime environments for an operating system (OS) and Trusted Execution Environment (TEE) including an embedded trusted network security perimeter. The isolation is performed by hardware ARM Security Extensions added to ARMv6 processors and greater and controlled by Trust-Wall software. The invention therefore comprises an embedded network security perimeter running in TEE on one or more processor cores with dedicated memory and storage and used to secure all external network communications of the host device. The invention addresses network communications control and protection for Rich OS Execution Environments and describes minimal necessary and sufficient actions to prevent unauthorized access to or from external networks. The present invention uses hardware platform security capabilities which significantly increase protection of the embedded network security perimeter itself from targeted attacks, in contrast to existing, and representing an improvement of, end-point software firewalls. In addition, embodiments of the invention do not require any modification to the OS system code or network application software.

14 Claims, 5 Drawing Sheets

(51) Int. Cl.
*H04W 12/02* (2009.01)
*H04W 12/08* (2009.01)

(52) U.S. Cl.
CPC ...... *H04L 63/0209* (2013.01); *H04L 63/0272* (2013.01); *H04W 12/02* (2013.01); *H04W 12/08* (2013.01); H04L 2209/127 (2013.01)

(56) References Cited

U.S. PATENT DOCUMENTS

| | | | |
|---|---|---|---|
| 9,749,294 B1* | 8/2017 | Marquardt | H04L 63/0272 |
| 9,792,143 B1* | 10/2017 | Potlapally | G06F 9/45558 |
| 2006/0026422 A1* | 2/2006 | Bade | H04L 63/104 |
| | | | 713/164 |
| 2006/0206300 A1 | 9/2006 | Garg et al. | |
| 2015/0188949 A1* | 7/2015 | Mahaffey | H04L 63/20 |
| | | | 726/1 |
| 2016/0246977 A1* | 8/2016 | Raskin | H04L 63/0428 |

OTHER PUBLICATIONS

ARM, "ARM® Architecture Reference Manual, ARMv7-A and ARM v7-R edition", 2014.
ARM, "CoreLink TrustZone Address Space Controller TZC-380 Technical Reference Manual, Revision r0p1", 2010.
ARM, "PrimeCell Infrastructure AMBA 3 TrustZone Protection Controller (BP147), Revision: r0p0, Technical Overview", 2004.
Freescale Semiconductor, Inc., "i.MX 6Dual/6Quad Applications Processor Reference Manual, Rev. 3, Jul. 2015", 2015.

* cited by examiner

EMBEDDED TRUSTED NETWORK SECURITY PERIMETER IN COMPUTING SYSTEMS BASED ON ARM PROCESSORS

FIELD OF THE INVENTION

The present invention generally relates to network communication protection on mobile devices by providing an embedded trusted network security perimeter using particular ARM processor Security Extensions and optional Virtualization Extensions.

Current mobile devices such as tablets or smart phones often provide rich OS functionality without any restrictions on network access. This unrestricted network access generally poses a high risk for malware infection or data leakage. The present invention particularly addresses the threat of unauthorized network access or data leakage from a mobile device.

Embedded trusted network security perimeter runs in the TEE on one or more cores with dedicated memory and storage. All network traffic from an OS running in a Rich OS Execution Environment to external networks unconditionally goes through security checks and transformations performed in the TEE.

The present invention addresses threats of unauthorized network access or data leakage in the scenario where the Rich OS is compromised and its security related settings are compromised. In such a scenario, the hardware-protected embedded trusted network security perimeter remains active and performs all checks and transformations required by a security policy.

RELATED ART

The following references identify related art:
[1] Shanbhogue Vedvyas [U.S. Pat. No. 8,190,778 B2] Method And Apparatus For Network Filtering And Firewall Protection On A Secure Partition
[2] Garg Pankaj, Kinsey Jeffrey B [Patent Application US 2006/0206300 A1] Vm Network Traffic Monitoring And Filtering On The Host
[3] Crowell Zachary Thomas, Khalidi Yousef A, Talluri Madhusudhan [U.S. Pat. No. 8,151,337 B2] Applying Firewalls To Virtualized Environments
ARM Architecture Reference Manuals: http://infocenter.arm.com/help/index.jsp?topic=/com.arm.doc.ddi0406c/index.html
ARM Cortex-A series processor Technical Reference Manuals: http://infocenter.arm.com/help/index.jsp?topic=/com.arm.doc.ddi0388e/index.html
CoreLink TrustZone Address Space Controller TZC-380 Technical Reference Manual: http://infocenter.arm.com/help/index.jsp?topic=/com.arm.doc.ddi0388e/index.html
PrimeCell Infrastructure AMBA 3 TrustZone Protection Controller Technical Overview: http://infocenter.arm.com/help/index.jsp?topic=/com.arm.doc.ddi0388e/index.html
i.MX 6Dual/6Quad Applications Processor Reference Manual: http://cache.freescale.com/files/32bit/doc/ref_manual/IMX6DQRM.pdf?fasp=1&WT_TYPE=Reference%20Manuals&WT_VENDOR=FREESCALE&WT_FILE_FORMAT=pdf&WT_ASSET=Documentation&fileExt=.pdf

BACKGROUND OF THE INVENTION

The ARM Security Extensions extend the processor architecture to provide hardware security features that support the development of secure applications, by providing two processor security states. Rich OS Execution Environment is running in Normal World when the processor is in Non-secure state. A Trusted Execution Environment (TEE) and its trusted applications are running in Secure World when the processor is in Secure state. The most important system control resources are only accessible from the TEE. Each security state has its own system registers and memory address space. The execution privilege levels are defined independently in each security state.

The Virtualization Extensions further extend the processor architecture to provide virtualization capabilities. Some of the ARM processor implementations do not include the Virtualization Extensions. The present invention does not require Virtualization Extensions, however it includes embodiments both with and without Virtualization Extensions.

Some of the ARM processor implementations do not include the Security Extensions. The present invention is applicable only to computer systems based on ARM processors with Security Extensions.

While the main purpose of ARM Security Extensions is isolation between Normal and Secure Worlds, the present invention provides the innovative approach of using these Security Extensions to isolate and protect an embedded security perimeter which is used to control all external network communications of a computer system.

In order to achieve memory separation between two execution environments, memory access rights are configured through ARM Memory Management Unit (MMU) (see ARM Cortex-A series processor Technical Reference Manuals), TrustZone Address Space Controller (TZASC) (see CoreLink TrustZone Address Space Controller TZC-380 Technical Reference Manual) and TrustZone Protection Controller (TZPC) (see PrimeCell Infrastructure AMBA 3 TrustZone Protection Controller Technical Overview) or through vendor specific Security Extension hardware modules, for example Central Security Unit (CSU) in iMX6 Freescale processor (see i.MX 6Dual/6Quad Applications Processor Reference Manual).

FIG. 5 illustrates a generic method of memory access control. In ARM architecture, it is possible to set access rights to different memory regions (503, 507) for different processor mode sets. To achieve this, several hardware modules are integrated into the processor: MMU, TZASC and TZPC. Additionally, several processor manufacturers added their own extensions to enhance memory control functionality. For example, Freescale iMX6 processor uses CSU instead of TZPC to provide more granular access control and additional security functionality.

The most common memory access control mechanism is the MMU and it is currently used in popular OSs to separate system and user applications memory. The MMU is controlled by system control registers that can also disable the MMU. When the MMU is enabled, the processor works with virtual addresses and MMU works with memory system to translate virtual addresses to physical addresses. MMU divides memory into pages (4 KB, 64 KB, 1 MB, and 16 MB) and each page can have its own memory access attributes. The ARM processor enhanced with Security Extensions has a separate and independent MMU for Secure and Normal World execution environments.

The purpose of a TZASC module is separation of TEE memory from Rich OS Execution Environment. It works with random-access memory (RAM) only and can be configured from TEE only. As the MMU, it divides memory into regions and each region has its own memory access control attributes. The TZASC works totally independently of MMU even when MMU is disabled. The TZASC works with physical addresses and doesn't have any MMU virtual address awareness.

Since the TZASC module works only with RAM, the TZPC is used to control access between the Rich OS Execution Environment and TEE for memory regions where peripheral hardware device controllers and interfaces (504, 509, 505 and 511) are mapped. Also TZPC is used to control on-chip RAM access control in some ARM processors implementations. The TZPC could be configured from TEE only. Different ARM processors have different peripheral devices and interfaces, so TZPC regions are predefined and implementation dependent and only access rights to these regions can be changed in the runtime.

The present invention uses TZPC to provide controlled access to peripheral devices (504, 509, 505 and 511). The main TZPC function in preferred embodiments is to make hardware network interface as it's shown on FIG. 2 accessible only from TEE (206), while Rich OS Execution Environment (201) uses Virtual Network Interface (203) for network communications.

DETAILED DESCRIPTION

This section describes the present invention with reference to the accompanying drawings. The detailed description of these corresponding drawings and the exemplary embodiments are intended to make it apparent to one of ordinary skill in the art how to construct these exemplary embodiments. Various modifications may become apparent to those skilled in the art, such as other types of security technology, processors, memories, programming techniques, or protocols. Consequently, the invention is not limited to these exemplary embodiments because the same result may be accomplished with other technologies. The appended claims present the scope of the invention accordingly to encompass application of the invention to all applicable technologies.

Preferred embodiments of the present invention should have a hardware-enforced mechanism that can be configured by relatively simple and easily verified trusted boot procedure and also can uniquely identify each environment which restrains only its own resources.

This can be achieved using a trusted system boot loader mechanism that is currently implemented in most ARM processors and described in prior art, for example in Patent No. US20090204801A1. Such a system based on ARM processors uses a first stage system boot loader that is located inside on-chip read-only memory (ROM) to ensure integrity and authenticity of the external boot code and prevents system start using unauthorized code. This creates a trusted computing base where after boot completion, the system is in a determined state that cannot be altered. After initial boot completion other critical system components are loaded and could be protected with a "chain-of-trust" procedure i.e., a next component is loaded, verified and only after the successful completion of these steps is then executed.

Figure 1:
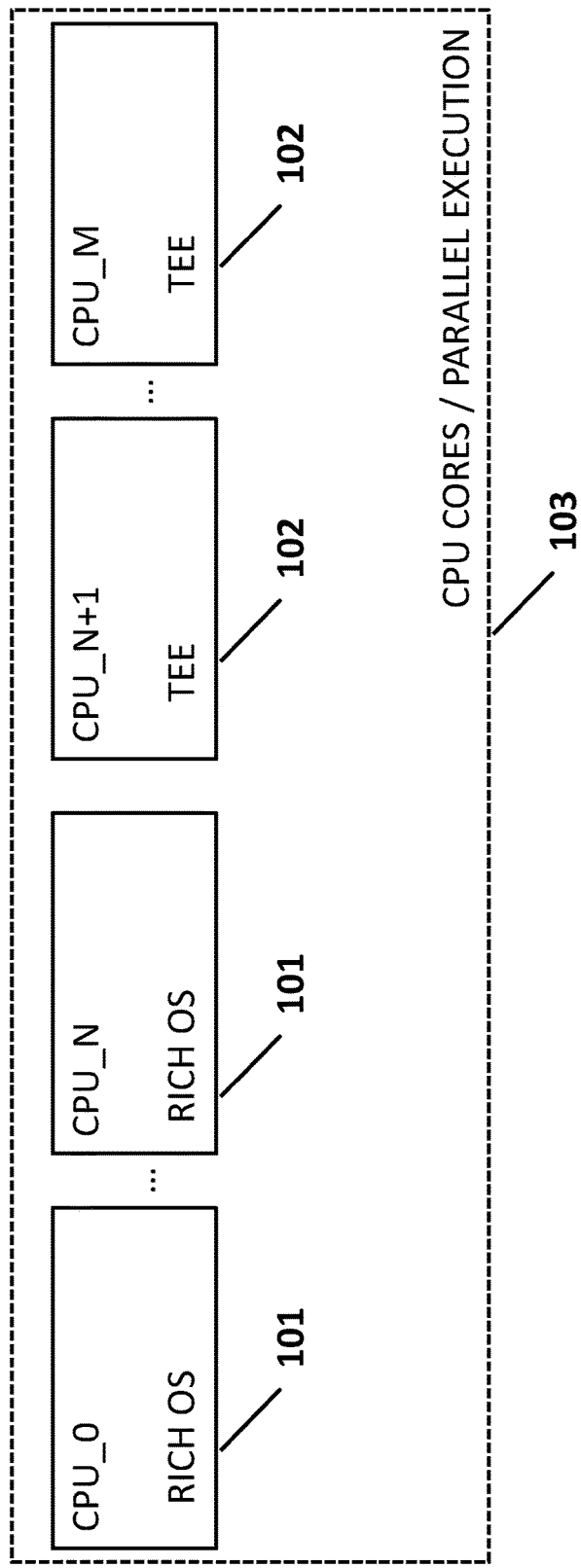
FIG. 1 illustrates a preferred embodiment of the invention, a computing system with a multi-core processor and fully hardware isolated runtime environments for TEE and Rich OS Execution Environments. The isolation inside a computing system is performed by hardware and controlled by the TrustWall software. One or more processor cores are dedicated to run Rich OS and other one or more processor cores are dedicated to run TEE code. This allows pure parallel execution without any Virtual Machines or Hypervisors running inside a computer system.

FIG. 1 illustrates a preferred embodiment of the invention, a computing system with multi-core (101-102) processor (103) and fully hardware isolated runtime environments for TEE and Rich OS Execution Environment. One or more processor cores (101) are dedicated to run Rich OS and other one or more processor cores (102) are dedicated to run TEE code. These environments may run in parallel. The embodiment presented uses dedicated processor cores for Rich OS and TEE and significantly decreases context switch cost in terms of time and processor resources comparing to Virtual Machine embodiments. It is obvious to one skilled in the art that depending on system workload, the number of dedicated processors for one of the environments could be changed dynamically, including the borderline situation when TEE is shut down and use zero processor cores.

Figure 2:
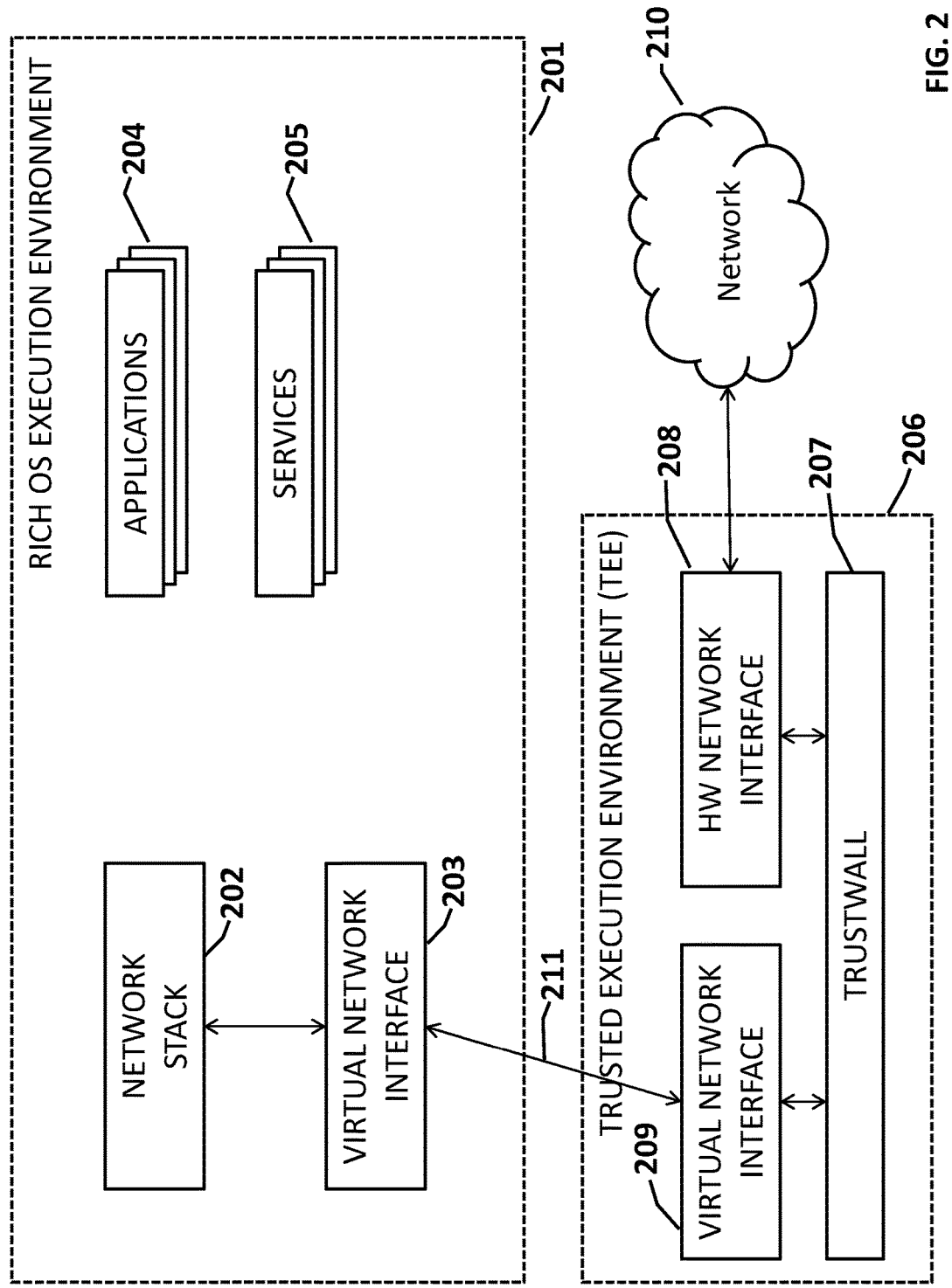
FIG. 2 illustrates the high level model of the invention. Embedded network security perimeter is running inside TEE. Access to physical network interfaces is allowed from TEE only. All network traffic from a Rich OS which is running in Normal World to external networks passes through security checks and transformations performed by TrustWall software in TEE.

FIG. 2 illustrates the high level model of the present invention where all network traffic (202) from an Rich OS running in Normal World Execution Environment (201) to external networks (210) goes through security checks (207) and transformations (207) performed by software modules running in Secure World TEE (206). The described approach does not require any modification to the OS system code or network application software and provides a standard network stack (202) for the software.

Communication (211) between Rich OS and TEE is performed using IRQ or FIQ hardware signals and dedicated shared memory segments. Optionally, Secure Monitor Calls (SMC) instruction can be used to switch between Secure and Normal World within one processor core.

Embedded network security perimeter running in TEE has an access to physical network interfaces (208) and Virtual Network Interface (209) while the network stack of the Rich OS can use Virtual Network Interface (203) only and does not have any access to physical network interfaces (208) on the hardware level.

TrustWall software (207) is fully transparent for the software of Rich OS and can be configured from TEE only according to security policy.

Figure 3:
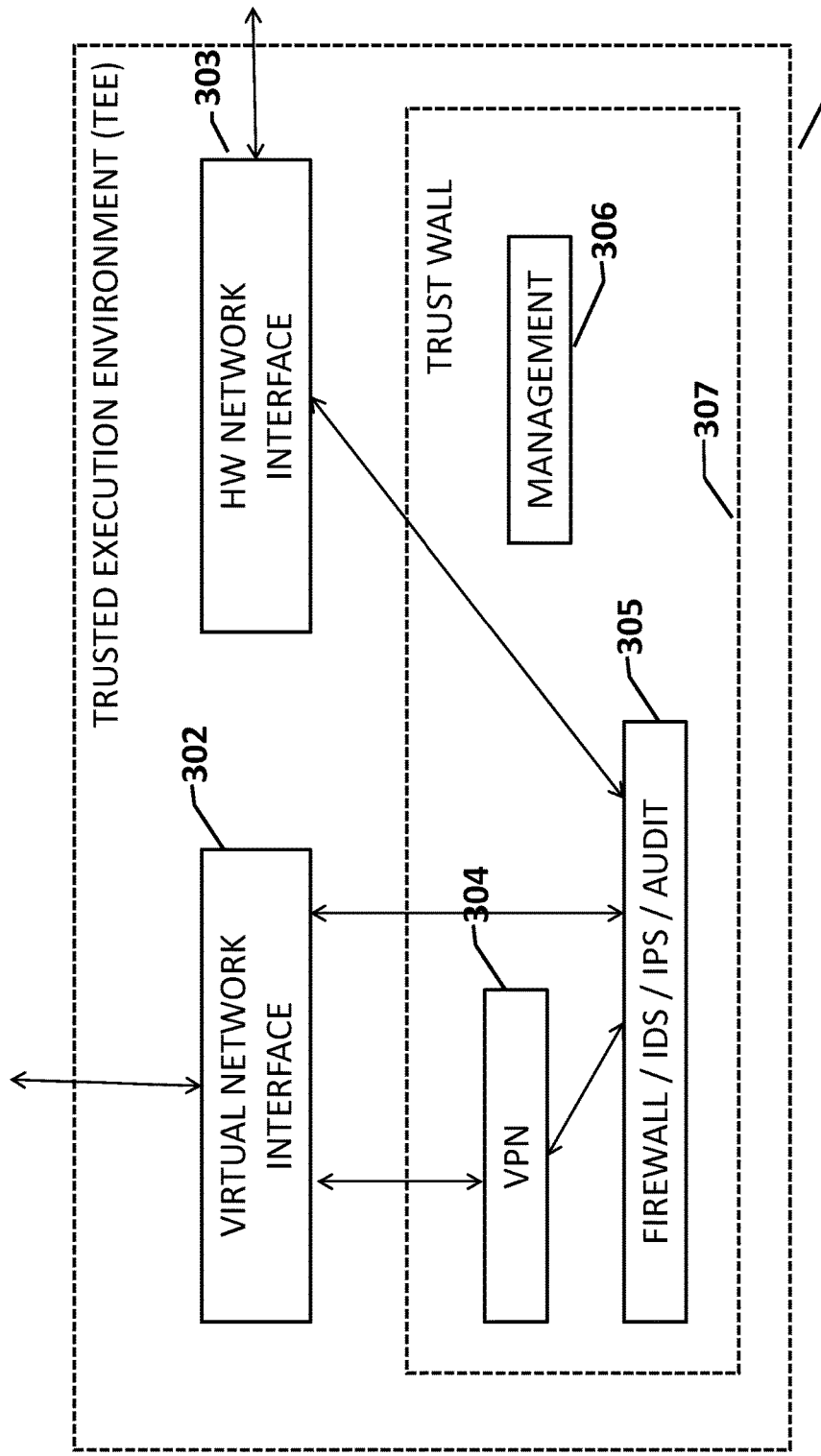
FIG. 3 illustrates a more detailed view of TEE. Software modules in TEE have an access to physical network interfaces and perform checks and transformations of the network traffic required by a security policy.

FIG. 3 illustrates a detailed model of the TEE. Virtual Network Interface (302) is used for communications with the Rich OS Execution Environment. All connections from Rich OS to external networks are forwarded to embedded network security perimeter (305) which includes Firewall, IDS, IPS and audit. Optionally, depending on security policy, connections may be forwarded through a VPN gateway (304) first. Only after the successful competition of the security checks and transformations data goes to physical Hardware Network Interface (303). All components of the TrustWall are managed by the Management System (306).

Figure 4:
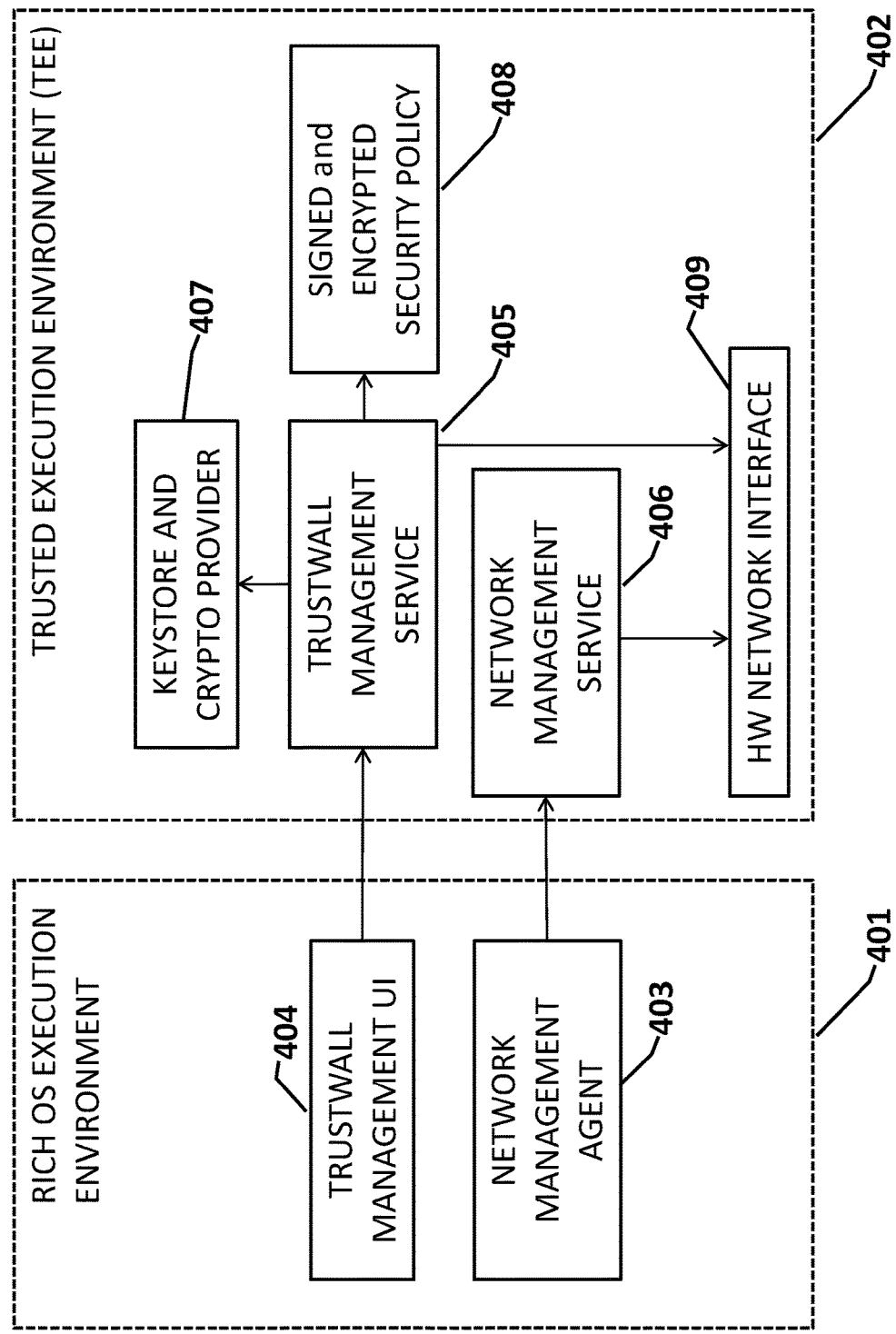
FIG. 4 illustrates the management system of the invention. All critical parts of the management system are located inside the TEE. Security policies are used as primary source of configuration data. Cryptographic keys used for decryption and digital signature verification of the security policies is accessible from TEE only.

FIG. 4 illustrates the management system of the invention. All critical parts (405-408) of the management system are located inside TEE (402). Security policies (408) are used as primary source of configuration data. Cryptographic keys (407) used for decryption and digital signature verification of the security policies (408) are accessible from TEE (402) only.

Non-critical parts (403, 404) of the management system are located in Rich OS Execution Environment. TrustWall Management User Interface (404) provides a user with a tool to interact with TrustWall Management Service (405) where a user can locally view or modify some of security policy settings. Other security policy settings can be changed by a Network Management Agent (403) using remote Management Service (406).

In the present invention, cryptographic keys used for decryption and digital signature verification of the security policies are managed by KeyStore and Crypto Provider (407) and accessible from TEE only.

Crypto Provider allows indirect and controlled work with cryptographic keys. For example, TPM as it described in prior art, Patent No. US008375221B1 or other implementations could be used. Also Crypto Provider can be used to simplify integrity and authenticity checks and provide hardware accelerated encryption for Rich OSs.

Figure 5:
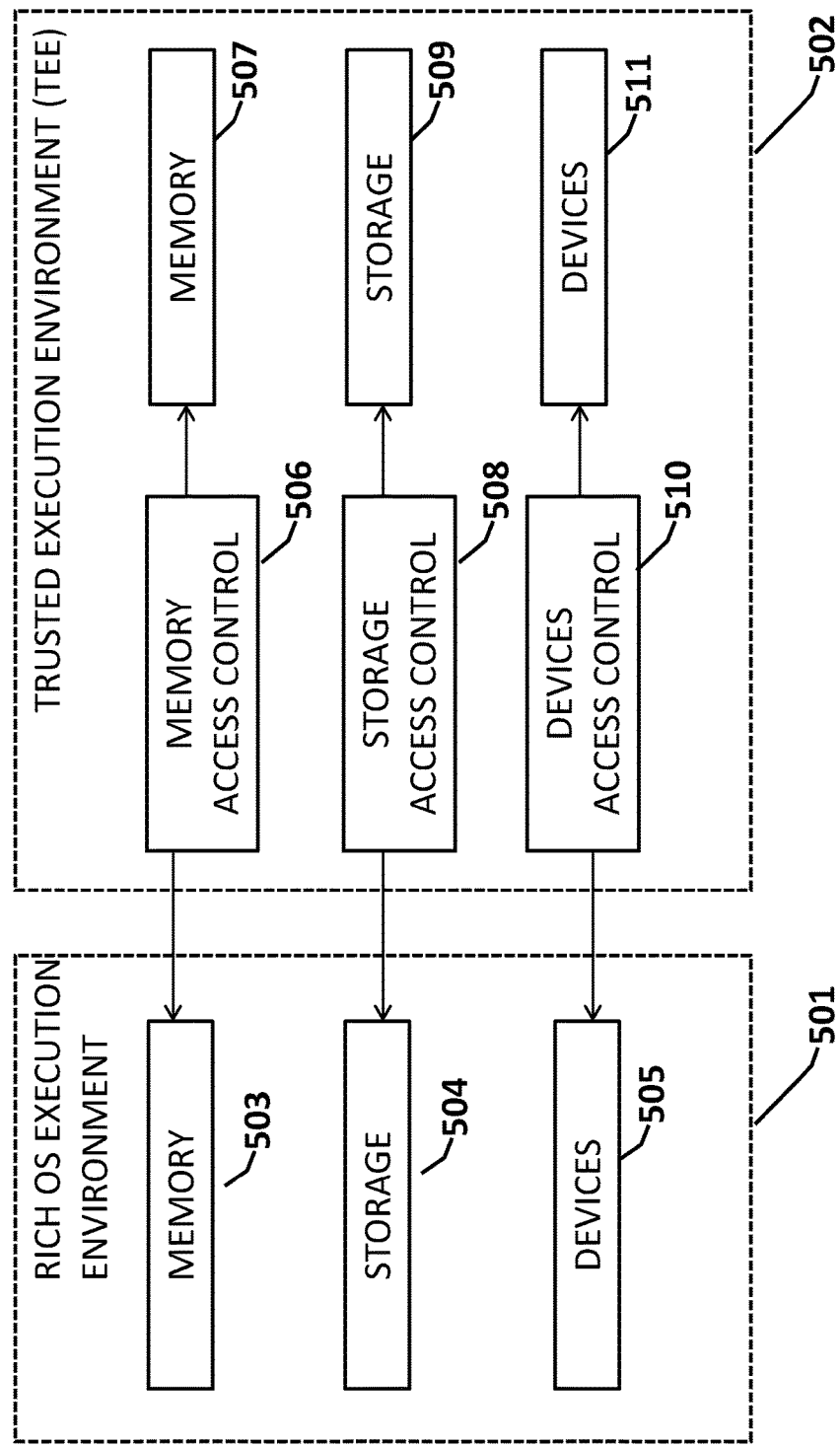
FIG. 5 illustrates hardware enforced memory, storage and devices access control modules. All described modules are located in TEE and perform access control for both Secure and Normal World. Access control rules can be fixed or dynamic (configured via security policies).

FIG. 5 illustrates hardware-enforced memory (506), storage (508) and devices (510) access control modules. All described modules are located in TEE (502) and perform access control both for resources (507, 509, and 511) of Secure and resources (503-505) of Rich OS Execution Environment (501). It is critically important that no hardware resources should be left for shared use from different environments without access control modules management. Access control rules can be fixed or dynamic (configured via security policies).

Access control modules utilize ARM processor Security Extensions such as TZPC or hardware Virtualization Extensions to control access level to particular hardware resources such as internal hardware devices, hardware interfaces and external peripheral devices from OSs that are running in the Normal World.

Security and Virtualization Extensions of current ARM processors allows isolated runtime environments to be established using the method presented in this invention.

General purpose RAM access control is configured through TZASC and MMU. The memory region access control for hardware interfaces is configured through TZPC. MMU stage 2 can be used for memory access control on the computing systems that use Virtualization Extensions of ARM processor. In the ARM architecture access to TZASC and TZPC configuration is allowed only from TEE (502) and denied from Rich OS Execution Environment (501). In the present invention memory access control is used for separation of runtime execution environments.

I claim:

1. A computing system with an embedded network security perimeter that incorporates capabilities to secure external network communications comprising:

a computer system based on an Advanced RISC (Reduced Instruction Set Computer) Machines (ARM) processor with integrated Security Extensions;

an embedded network security perimeter running in a Trusted Execution Environment (TEE) on the ARM processor with dedicated memory and storage; and an Operating System (OS) running in a Rich OS Execution Environment on the ARM processor with a dedicated memory and a storage for the OS;

wherein the TEE and Rich OS Execution Environment are hardware isolated from each other using the integrated security extensions, wherein only the embedded network security perimeter has an access to a physical network interface, wherein all network traffic from the Rich OS to external networks goes through security checks and transformations performed by the embedded network security perimeter in the TEE, wherein the embedded network security perimeter is controlled by a management service, wherein the management service uses a security policy as a primary source of configuration data, and wherein the security is protected using an encryption signature for decryption and a digital signature of the security policy is accessible only from the TEE.

2. The computing system as claimed in claim 1 wherein the embedded network security perimeter comprises a network firewall and a VPN gateway, wherein:

the management service uses an additional input data from a device controlled by the TEE, and the security policy comprises one or more a local security policy or a remote security policy.

3. The computing system as claimed in claim 1 wherein the TEE performs access control of the storage, other devices and external interfaces.

4. The computing system as claimed in claim 1 where data exchange between the TEE and a Normal world is performed using one or more of a System Memory Controller (SMC), an Interrupt Request (IRQ), or a First Interrupt Request (FIQ).

5. A computing system comprising:

a physical network interface;

a security policy for the physical network interface;

a processor comprising:

a Trusted Execution Environment (TEE) comprising an embedded network security perimeter to secure the physical network interface, integrated Security Extensions, and a Rich Operating System (OS) Execution Environment to request network traffic to and from the physical network interface; and a management service to control the embedded network security perimeter, wherein the TEE and the Rich OS Execution Environment are hardware isolated from each other using the integrated security extensions, the management service uses the security policy as a primary source of configuration data, the embedded network security perimeter in the TEE performs security checks and transformations on the network traffic, and wherein the security is protected using an encryption signature for decryption and a digital signature of the security policy is accessible only from the TEE.

6. The computing system of claim 5, wherein in the Rich OS Execution Environment is running an OS with a dedicated memory and a storage, and the OS requests the network traffic to and from the physical network interface.

7. The computing system of claim 5, wherein the embedded network security perimeter comprises one or more of a network firewall or a VPN gateway.

8. The computing system of claim 5, wherein the management service uses an additional input data from a device controlled by the TEE.

9. The computing system of claim 5, wherein the security policy comprises one or more a local security policy or a remote security policy.

10. The computing system of claim 5, further comprising a storage and an external interface, wherein the TEE performs access control of the storage and the external interface.

11. The computing system of claim 5, wherein a data exchange between the TEE and an outside of the TEE uses one or more of a System Memory Controller (SMC), an Interrupt Request (IRQ), or a First Interrupt Request (FIQ).

12. The computing system of claim 5, wherein the security policy grants the TEE access to the physical network interface.

13. The computing system of claim 12, wherein the security policy prevents the Rich OS from accessing the physical network interface, and the TEE provides the Rich OS with authorized access to the physical network device.

14. The computing system of claim 5, wherein the security policy denies prevents the Rich OS from accessing the physical network interface.

* * * * *